United States Patent [19]
Pickett

[11] Patent Number: 6,012,144
[45] Date of Patent: Jan. 4, 2000

[54] TRANSACTION SECURITY METHOD AND APPARATUS

[76] Inventor: Thomas E. Pickett, 8406 Springston La., Columbus, Ohio 43235

[21] Appl. No.: 08/942,570

[22] Filed: Oct. 1, 1997

Related U.S. Application Data

[60] Provisional application No. 60/027,968, Oct. 8, 1996.

[51] Int. Cl.[7] .................................................. H04L 9/00
[52] U.S. Cl. .............................. 713/201; 380/33; 705/39
[58] Field of Search .......................... 713/200, 201–202; 380/21, 23, 25, 33; 709/217, 219; 705/39; 235/380

[56] References Cited

U.S. PATENT DOCUMENTS

| | | | |
|---|---|---|---|
| 5,321,840 | 6/1994 | Ahlin et al. | 395/700 |
| 5,671,279 | 9/1997 | Elgamal | 380/23 |
| 5,684,951 | 11/1997 | Goldman et al. | 395/188.01 |
| 5,715,399 | 2/1998 | Bezos | 395/227 |
| 5,826,245 | 10/1998 | Sandberg-Diment | 705/44 |

*Primary Examiner*—Robert W. Beausoliel, Jr.
*Assistant Examiner*—Scott T. Baderman
*Attorney, Agent, or Firm*—Watts, Hoffmann, Fisher & Heinke, Co., L.P.A.

[57] ABSTRACT

A method for performing secure transactions, such as credit card purchases, using two or more non-secure networks (such as the Internet and the public telephone system) in such a way that security is insured. A person wishing to initiate a secure transaction sends a message over one of the non-secure networks to a computer. That computer automatically uses the second non-secure network to contact the person back to verify the transaction. The call-back mechanism employs a method to authenticate the identity or authority of the person initiating the transaction. No single wire-tapping or network snooping device sees the entire transaction. No single database contains the entire set of information.

4 Claims, 7 Drawing Sheets

TRANSACTION SECURITY METHOD AND APPARATUS

This application claims the benefit of prior U.S. provisional application: Ser. No. 60/027,968, filed on Oct. 8, 1996.

FIELD OF THE INVENTION

The invention relates to the field of computer information security.

DESCRIPTION OF THE BACKGROUND ART

Security has long been an important issue in the design of computer systems and communication networks. Government agencies, standards organizations, and private concerns have created many techniques and tools for insuring the integrity and security of data as they are stored on or transmitted between computer systems. The current level of technology and structure of its knowledge can almost be considered a field of science today.

Encryption techniques scramble data into an unrecognizable form. There are two basic types of encryption—one-way and two-way. In addition, each type may either be "keyed" or "non-keyed". One-way encryption techniques are the most secure. It is impossible (or virtually impossible) to unscramble the data back into their original form. This is useful for storing passwords on a storage mechanism. Authentication is done by having a user enter a password, encrypting it into its one-way form and seeing if the scrambled results match the scrambled results that are stored. This technique, however, assumes that the user is directly connected to the computer's security system and that the keystrokes typed by the user as the password is being entered are not being transmitted to the computer doing the encryption over a non-secure medium. It is also not appropriate to use an intelligent terminal at the user's location to encrypt the password before sending it over a non-secure network, because the encrypted form can be intercepted and replayed by an unauthorized entity to gain access.

Two-way encryption techniques allow more flexibility for communication and in addition have more application. For example, a credit card number MUST be stored using a two-way encryption technique (assuming ANY encryption is to be used) so that it can be reassembled into a form that the credit card company can understand.

Two-way encryption techniques are the basis for most security methods employed over networks. The problem with this is that if the encryption technique becomes known, then the data being sent using it become vulnerable. This is where "keyed" two-way encryption techniques come in. These techniques scramble the data using a two-way technique which uses certain intrinsic information of a supplied "key" or password to determine how the data are altered. The data can be reassembled back into their original content by applying the key to the appropriate decryption method. Therefore, it is not enough to know the method used; one must also know the key (password) that was used as well. Security leaks (from insiders) can destroy the security of such systems. Therefore, keys are changed often.

Certain security systems use different encryption mechanisms to have computers at both ends of a communication session agree on an encryption key before data are sent. This means the information necessary to reassemble the transmitted data exists somewhere, and the data are therefore not totally secure. In addition, these techniques require intelligent software at both ends of the communication channel to agree on the keys and encrypt and decrypt the data.

Users of the Internet (more specifically the World Wide Web) typically have an intelligent processor at their ends (i.e. their PCS) however most of the information being presented by individuals and businesses on the Web use non-secure protocols like HTML for sending information. Other developments, such as Kerberos and SSL have created methods for sending fairly secure transactions; however even these can fail. A recent announcement from the COAST Laboratory (Computer Operations, Audit, and Security Technology) at Purdue describes a serious security flaw in Kerberos version 4 and the existence of a similar problem in version 5. And one leading vendor that uses an SSL-based protocol built into their commercially-available browser carefully reminds users that their sensitive information, even if transmitted securely, is only as secure as the administrators of the system to which they sent their information. Repeated transmissions of sensitive data over non-secure networks like the Internet continues to raise the risk of these data being misused.

Because of the explosive growth of the Internet, more specifically the World Wide Web, a tremendous need has appeared for the ability for users to send sensitive information like credit card numbers to other sites on the network. Many techniques have been developed using the encryption methodologies mentioned above. Some companies have recognized the dangers of sending even encrypted sensitive information over the Internet and have offered services using other methods of transmitting the information. Some use Fax services, and others use the telephone. However, in all cases so far, the user is still required at some point in time to transmit the sensitive data across a non-secure medium in one form or another. Therefore, all these methods open up a risk to the user, and this risk is usually repeated over and over. Even when credit card information is carried by the postal service to the vendor, it would be simple for an unscrupulous employee of that vendor to "embezzle" one or more incoming envelopes. Most people realize this and feel very nervous about having any of their credit card numbers floating around somewhere, totally in tact, and completely out of their control.

The common problem to all these techniques is that the sensitive information is always sent, in tact, over a single method that can be intercepted.

SUMMARY OF THE INVENTION

The present invention concerns method and apparatus for transmitting sensitive data to a remote data store. This data transmission is performed by sending a first subset of data, which by itself is non-threatening, to the remote data store by means of a first communications path using a first protocol and sending a second subset of data, which is also by itself non-threatening, to the remote data store by means of a second communications path using a second, different protocol. The two subsets of data are subsequently used to complete a transaction. (The term "non-threatening" is slightly different than the term "secure". A secure message cannot be understood or mimicked by an unauthorized party. A non-threatening message might be able to be intercepted and understood, but doesn't contain enough information in it to pose any threat to the security of the sender or receiver. In fact, to be even more precise, a message is only truly non-threatening if, in addition, unauthorized duplication or imitation also poses no threat to the users' security.)

In accordance with a preferred embodiment, the present invention is used to complete a data transfer using the Internet and the public switched telephone system. Rather than attempt to find ways to make the Internet secure or to make messages transmitted over the Internet secure, the invention breaks the desired messages into pieces—none of which on their own contain enough information to cause a threat to the security of the person sending the message. Yet, the combination of these pieces creates the information necessary to effect the desired secure transaction—such as a credit card purchase. Since the separate pieces are transmitted over two or more separate networks, at separate times using at least two separate technologies, intercepting all of the pieces and assembling the total message is virtually impossible except for the intended receiver of the message.

These and other advantages and features of the present invention will become better understood from the following detailed description of one embodiment of the invention which is described in conjunction with the accompanying drawings and exhibits.

DESCRIPTION OF PREFERRED EMBODIMENTS

Figure 1:
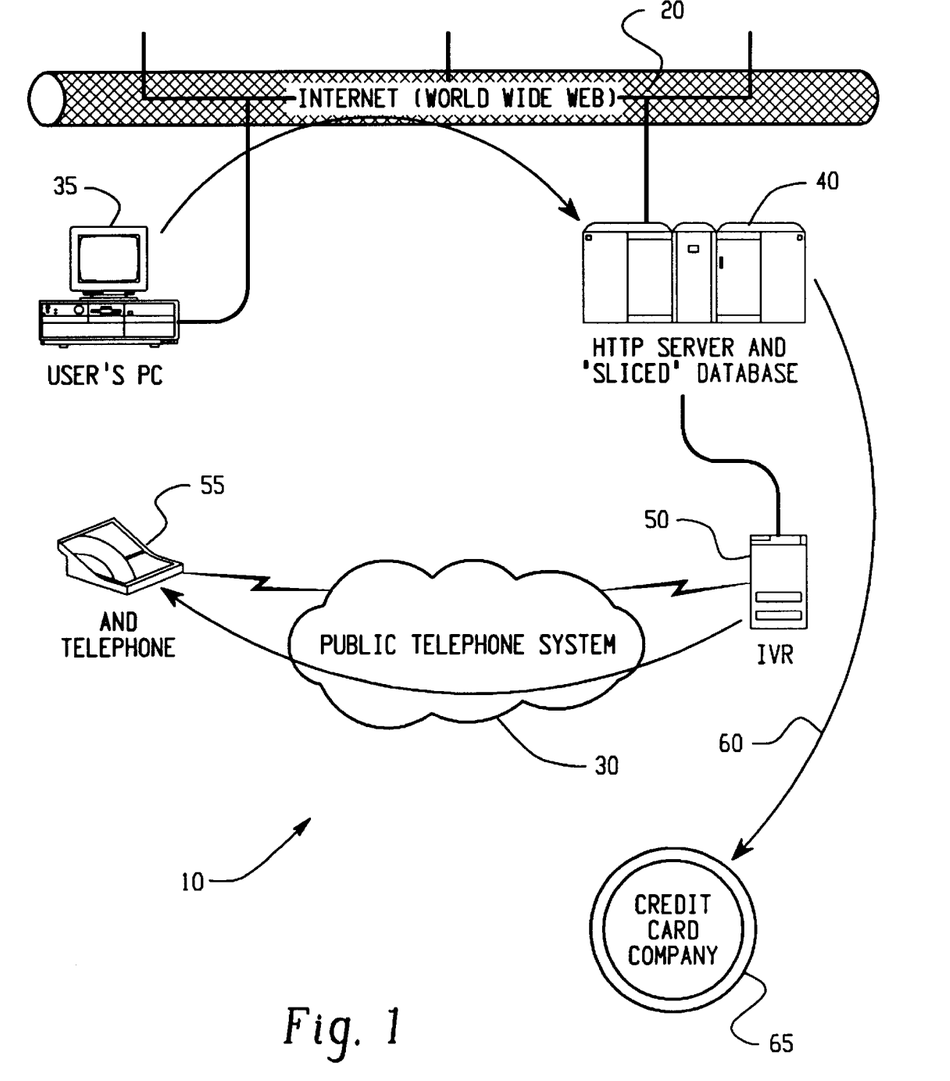
FIG. 1 shows a high-level representation of the communication used by a current embodiment to perform a highly secure transaction using two non-secure networks.

As depicted in FIG. 1, the invention relates to a system 10 for allowing people to purchase products and services from businesses directly from their public World Wide Web pages using credit cards. A preferred embodiment protects credit card information by means of a highly secure mechanism, yet utilizes the World Wide Web, a completely non-secure network.

The users of the security system 10 employ two different types of secure transactions. The first type is used to register the user's credit cards. The second type is used to make purchases using those registered credit cards. Both types of transactions are initiated by the user over the Internet, and both require utmost security. Therefore, each type will involve two separate networks—the first one being the Internet 20. The second network that is used is the public telephone system 30. For each type of transaction, the system calls the user on the telephone to receive the remaining information or authorization necessary to perform it.

FIG. 1 shows an overview of a first type of transaction, wherein a user registers one or more of his credit cards from his or her home computer 35. Three "messages" comprise the entire transaction, however, the first two are transmitted over non-secure networks and therefore employ the methods and apparatus of the invention. The first message is initiated by the user and is sent over the Internet 20 to a remote computer system 40. This message contains only a portion of each credit card number. The second message is subsequently initiated by the computer system 40. Thke system 40 employs an Interactive Voice Response system (IVR) 50 and communicates with the user using voice communication with a user via a telephone 55 to prompt the user to enter the remaining information. After both messages have been successfully transmitted from the user to the computer system 40, and at the user's approval, the system 40 then sends a third message over a secure network 60 to the user's selected credit card company 65. Such secure networks exist by providing tightly limited access to them.

For increased security, the information from the two messages received from the user for this type of transaction are stored in two differently encrypted databases on the computer system 40 in such a way that no malicious individual who has access to the computer system's data store can access the databases, match the corresponding halves, and gain improper use of anyone's credit card information. The storage mechanism involves "slicing" the database into two halves that have similar properties to the messages used to transmit the data. That is, there is not enough information in either database by itself to pose a security threat. Instead, two corresponding records containing the matching halves of secure data must be accessed, decrypted, and assembled into the complete information. These two databases are called "slices" and in the computer system 40 are numbered 0 and 1.

Figure 2:
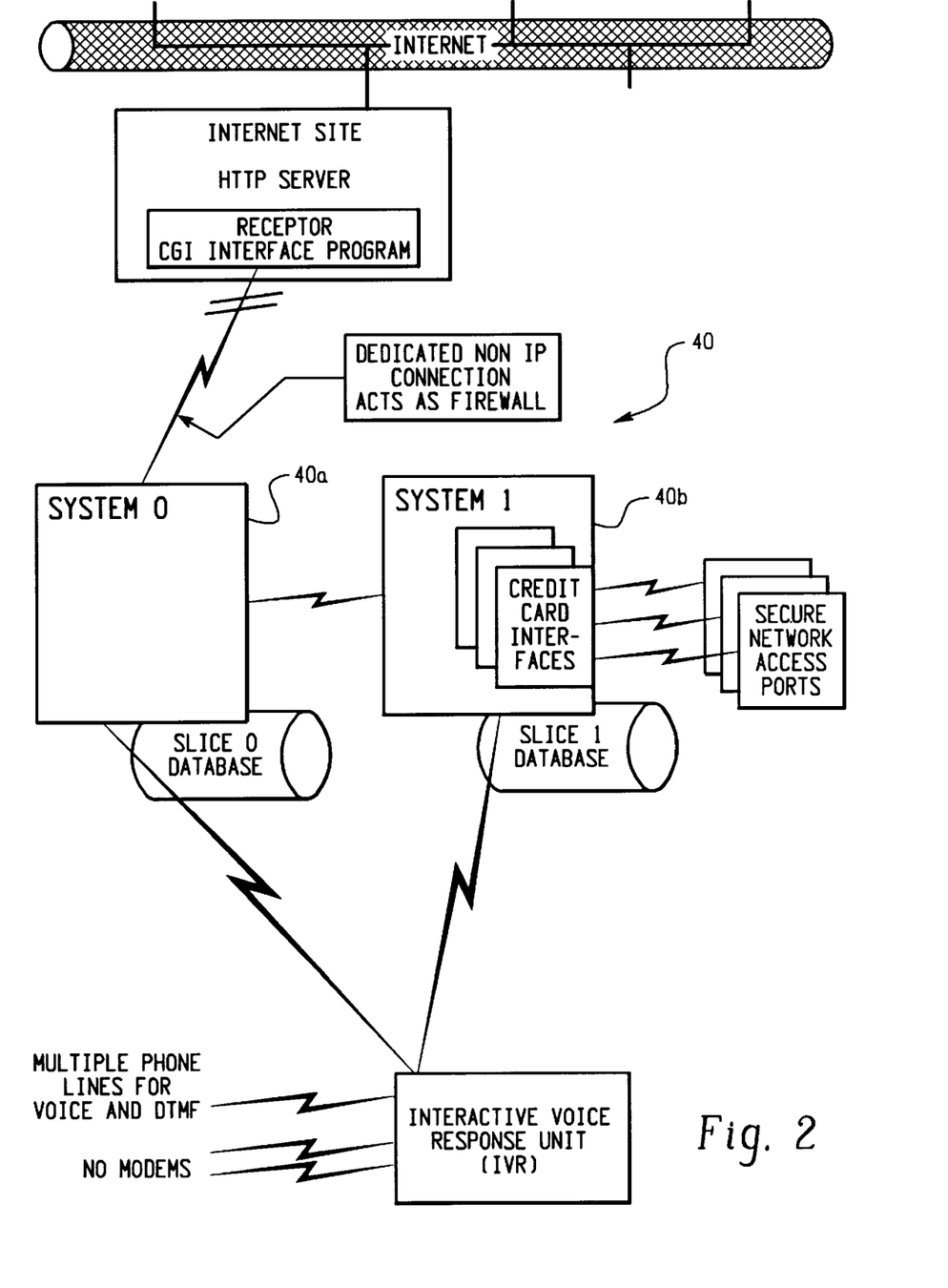
FIG. 2 is a schematic showing more detail of a computer system used in conjunction with the present invention.

FIG. 2 shows the computer system 40 in more detail. The user's first message containing partial credit card information is received by PaySafe's computer subsystem 40a which is managing the Slice 0 database, and that message is then encrypted and stored. The subsystem 40a places a call to the user over the public telephone system 30 using an Interactive Voice Response Unit or IVR 50. The phone number to call is entered by the user from an HTML coded form on his or her computer. When the user answers the call and enters his Personal Identification Number (or PIN), he is guided by the IVR 50 to enter the remaining digits of each credit card number. A preferred embodiment of the invention requests the user to use the telephone push buttons, but the technology now exists to allow the user to speak the remaining digits. Regardless of which type of sound is used (DTMF touch-tones or human speech), this second non-secure messaging medium is different from the one used to transmit the original message and communicates the missing information that completes the credit card data. This information is encrypted with a different technique than the one used by Slice 0 and is stored on a second subsystem 40b in a slice 2 database.

The following shows an example of how a data record is split between two database slices. Notice that certain fields are actually stored in two separate pieces—neither piece posing a security threat by itself. Furthermore, each database slice is stored using a two-way encryption technique. The data shown in the example are shown as their DECRYPTED equivalent except for the keys which are one-way encrypted and cannot be decrypted.

Example Sliced database record for user "someuser@some.domain.com" with following credit cards:

```
1234 5678 9876 5432          Exp 05/98
1111 2222 3333 4444          Exp 09/98
```

Figure 3A:
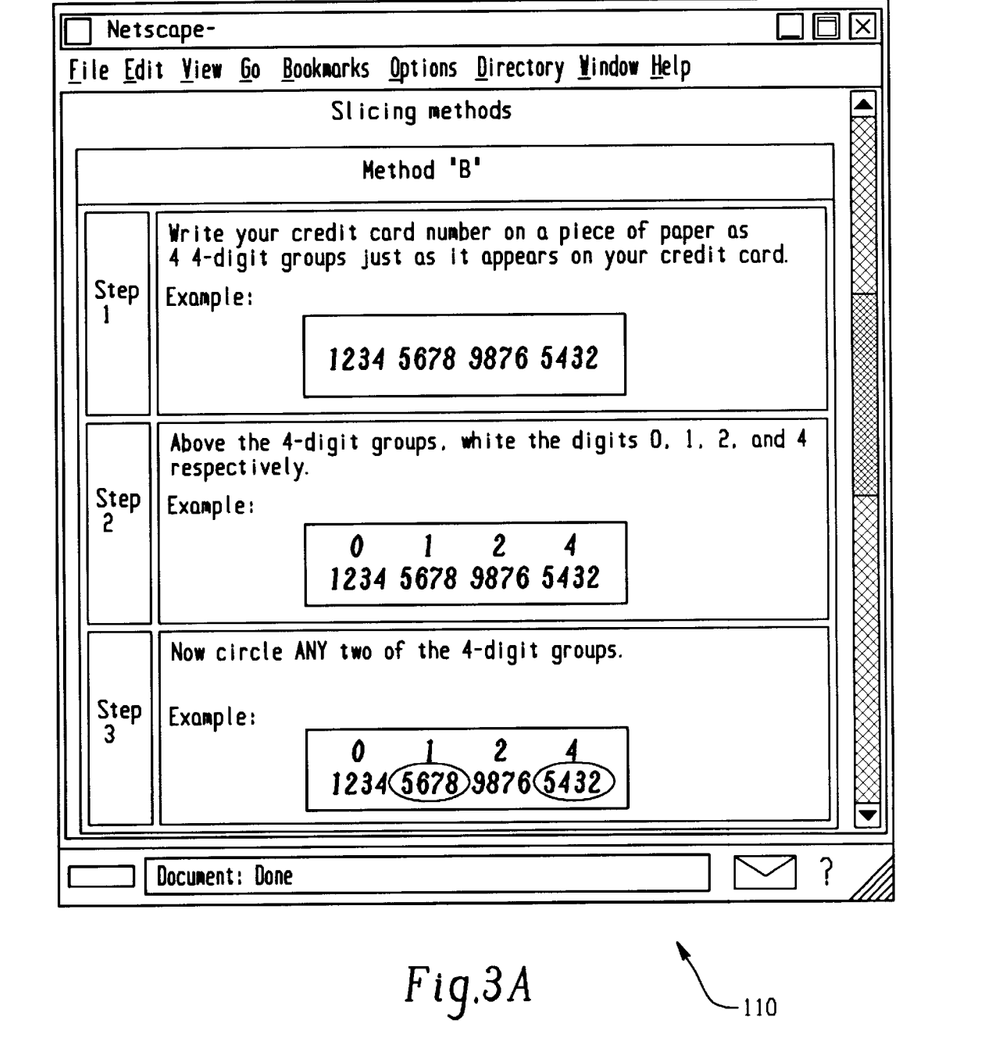
FIGS. 3A–3C illustrate display screens illustrating one of the methods a user of the current embodiment may select to divide each of his credit card numbers into two non-threatening parts.
Figure 3B:
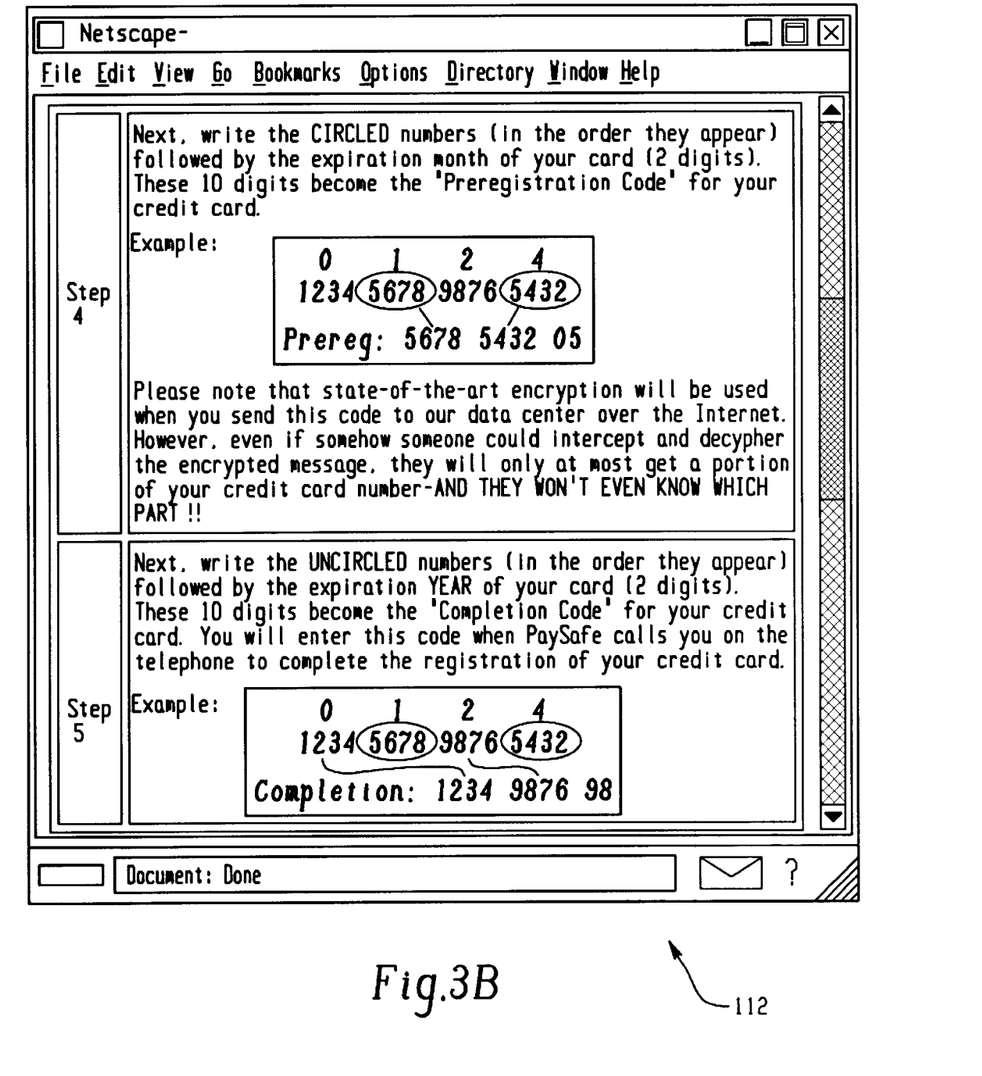
Figure 3C:
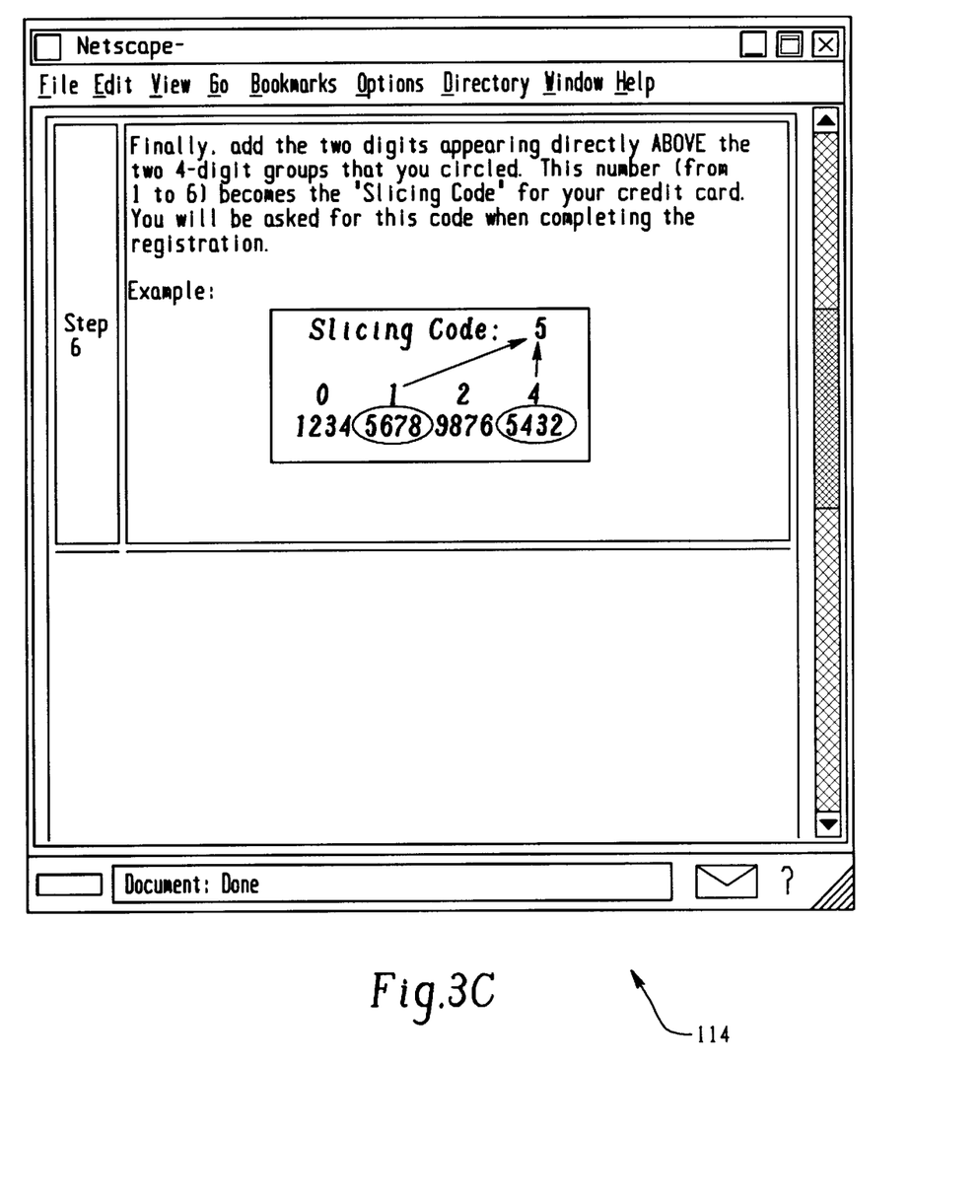

The user follows the instructions shown in the three windows 110, 112, 114 of FIGS. 3A–3C and chooses a slicing method (in this example, a method that chooses to send the $2^{nd}$ and $4^{th}$ 4-digit groups of each credit card number over the Internet is chosen). Although the user could used a different technique with each card, in this example the user uses the same technique for both cards. A form 120 (FIG. 4) is completed and the data entered into the form is transmitted by the World Wide Web to the computer system 40.

Figure 4:
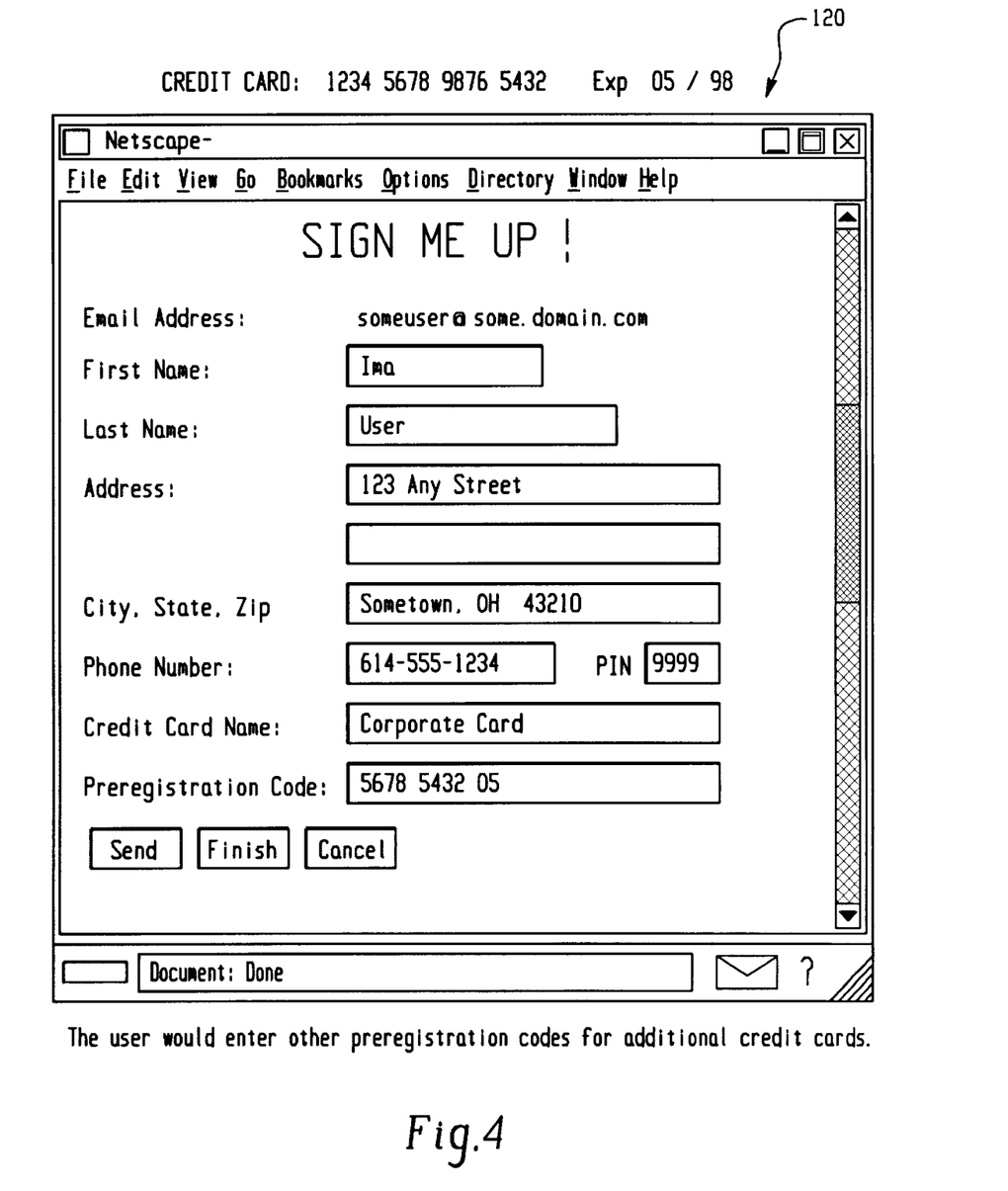
FIG. 4 shows a typical credit card registration transaction as it would appear on a user's PC from the World Wide Web wherein only a portion of a credit card number is entered.

The computer system 40 will then call the user to receive the $1^{st}$ and $3^{rd}$ 4-digit groups of each card over the telephone.

```
SLICE 0 DATABASE
(DATA SHOWN NON-ENCRYPTED EXCEPT FOR KEY)
User ID:
D8EM3OFD8GYRJE=LDJ&8JENFPOTGJMEUWIOFMNGHO . . .
(1-way encrypted)
User Name:        Ima User
Area Code:        614
Phone#:           555-1234
PaySafe PIN:      9999
User Timezone:    EDT
email:            smue@oedmi.o (only half of ID)
Credit Card 1 Name:            "Corporate Card"
Credit Card 1 Preregistration Code: 5678 5432 05
Credit Card 2 Name:            "Personal Gold Card"
Credit Card 2 Preregistration Code: 2222 4444 09
SLICE 1 DATABASE
(DATA SHOWN NON-ENCRYPTED EXCEPT FOR KEY)
User ID:
M4KREUF89GGHW3HEKLFOT-MDJD8RH4NTG_KDNMEI . . .
(1-way encrypted)
email: oesrsm.oancm (only half of ID)
.
.
.
Credit Card 1 Completion Code:    1234 9876 98
Slicing Code:                     5
Credit Card 2 Completion Code:    1111 3333 98
Slicing Code:                     5
```

FIGS. 3A–3C depict a step by step instruction the user is prompted with on his or her computer screen to register a credit card. The data is entered in the form 120 and is transferred to the computer system 40 as SLICE 0 data to be stored in the database subsystem 40a.

The following represents a typical telephone dialog that the computer system 40 conducts with the user to complete the credit card registration process needed to obtain and store the SLICE 1 data into a database.

Typical dialog initiated by the IVR completing a credit card registration:

"Hello, this call is to complete your credit card registration. Please enter your Personal Identification Number."
    <CUSTOMER ENTERS HIS PIN (9999) USING THE TELEPHONE KEYPAD>
"Thank you. You may abort this registration process at any time by simply hanging up your telephone."
"Completing the registration of your credit cards will post a two dollar and fifty cent charge to each one."
"If you make a mistake entering a completion code, simply press the pound key on your telephone and begin again."
"If you decide not to register a card, simply press the asterisk key on your telephone keypad when you are asked for its 10 digit completion code."
"Remember, you may abort at any time by simply hanging up, and you will ONLY be charged for each credit card registration you complete." "You have pre-registered 2 credit cards."
"Please enter your 10 digit completion code for your first credit card."
    <CUSTOMER ENTERS HIS FIRST 10 DIGIT COMPLETION CODE: 1234 9876 98>
"Now enter the slicing code for your first credit card."
    <CUSTOMER ENTERS 5>
"Thank you."
"Please enter your 10 digit completion code for your second credit card."
    <CUSTOMER ENTERS HIS SECOND 10 DIGIT COMPLETION CODE: 1111 3333 98
"Now enter the slicing code for your second credit card."
    <CUSTOMER ENTERS 5>
"Thank you."
"Your cards have been registered. You will receive an email notification of this transaction. Thank you for using our secure transaction registration."

A second type of transaction occurs when the user wishes to make a purchase on the Internet. Once again, security is mandatory, yet the networks used are individually non-secure. The user accesses a Web page 130 (FIG. 5) containing an order form for the product or service desired. That page accesses the computer systems's Slice 0 computer which presents to him a list of the credit cards he registered using the names he gave the cards when he registered. He selects which card to use, fills out the remaining information required for the order, and sends the transaction. Again, the resulting message does not contain enough information to cause a security threat to the user. Once again, both slices are needed.

Figure 5:
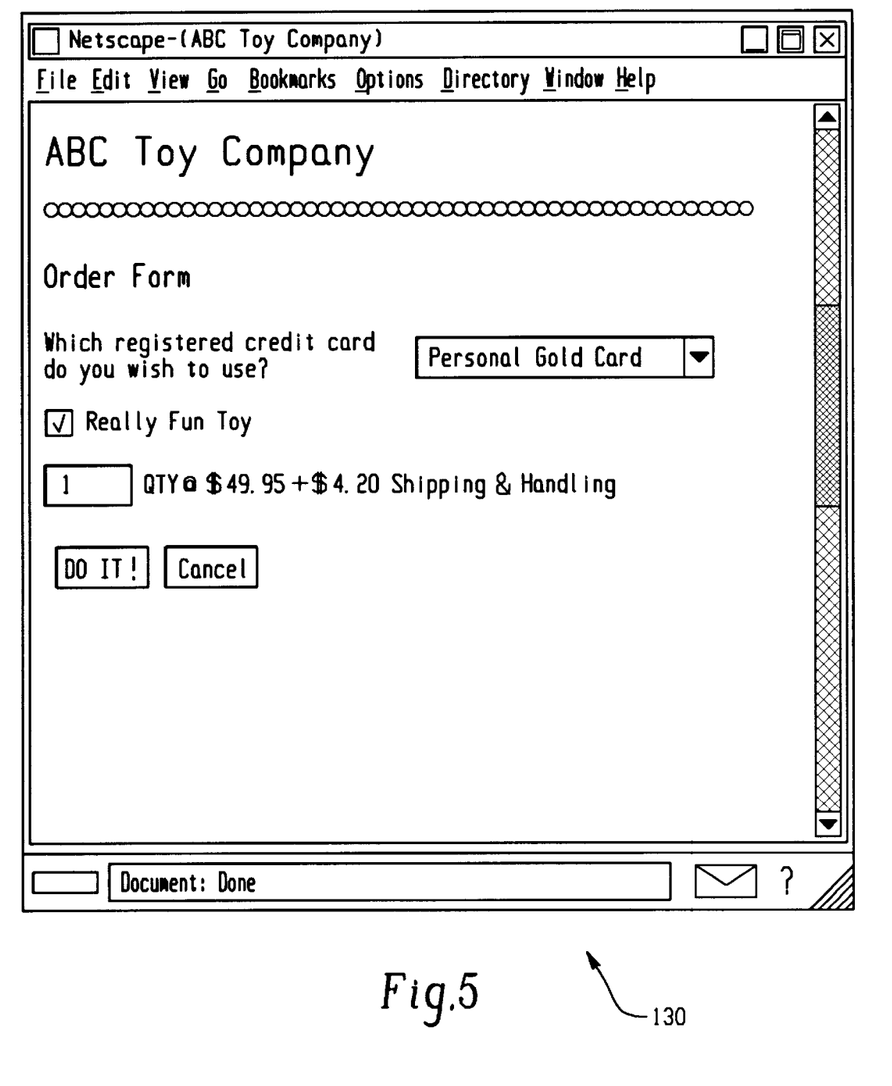
FIG. 5 represents a typical credit card purchase as it would appear on a user's PC from the World Wide Web. None of the user's credit card information needs to be transmitted over the Internet.

The Slice 1 computer again calls the user, insures that the correct person has answered by requiring the person to enter the correct PIN, and asks for verification for the purchase to take place. Again, this second communication does not contain enough information to be a threat by itself. In addition, since this second message must be initiated by the computer system 40, and can only be completed by someone at the user's phone number who knows the user's PIN, there is no danger of unauthorized duplication.

The following is a typical dialog from the IVR verifying the user's purchase:

"Hello, this call is to verify a purchase that was requested on the World Wide Web. Please enter your secure transaction Personal Identification Number."
    <CUSTOMER ENTERS HIS PIN (9999) USING THE TELEPHONE KEYPAD>
"Thank you."
"The purchase requested is from."
"ABC Toy Company".
"The following is the entire order:"
"1 Really Fun Toy"
"The total cost of this order, including your transaction fee is fifty-four dollars and ninety-five cents."
"Authorizing an order is as easy as 1-2-3. To authorize this order, please press one, two three. Otherwise, press 'X' or the 9 key to cancel this order request."
    <CUSTOMER PRESSES 1, 2, and 3>
"Thank you."
"As soon as the credit card authorization is accepted, your order will be processed. You will receive an email verification of this transaction. Thank you for using the secure transaction method of payment."

Once the user confirms by telephone that the transaction is to occur, the Slice 1 computer subsystem requests the other half of the user's information from the Slice 0 database, assembles the entire credit card number (along with expiration date and customer name) and sends a complete authorization request over the secure link 60 that is connected directly to the credit card company 65. This final message also gets transmitted only over a secure network and follows the appropriate encryption and protocols required by the specific credit card company. A copy of the order and the authorization number is then sent to both the vendor and the customer.

There must be a way to match records from one slice to their matching counterparts of another slice. Positional matching is not appropriate since the databases could theoretically become out of synchronization. Furthermore, there is seldom any guarantee on the physical placement of records in typical databases today. Therefore, using a record key in each slice is necessary. In order to add one more level of security, each slice encrypts the keys to the records using a one-way encryption method; however, to further protect the security of the database, each slice uses a different encryption method. Therefore, there is no way to match records of one slice with records of another without first knowing the user's personal ID number and performing each separate one-way encryption.

Typical examples of e-mail confirmation of registration and a purchase are depicted below:

```
To:         someuser@some.domain.com
From:       security@transact.com
Date:       dd/mm/yr
transaction on 23-Sep-1996 (All times EDT)
07:54 Call attempted at (614-555-1234) - ANSWERED
07:54 Correct PIN entered
07:55 Credit Card ("Corporate Card") registered successfully
07:55 Credit Card ("Personal Gold Card") registered successfully
To:         someuser@some.domain.com
From:       security@transact.com
Date:       dd/mm/yr
transaction on 26-Sep-1996 (All times EDT)
13:07 Call attempted at (614-555-1234) - BUSY
13:12 Call attempted at (614-555-1234) - BUSY
13:17 Call attempted at (614-555-1234) - ANSWERED
13:17 Correct PIN entered
13:17 Credit Card ("Personal Gold Card") purchase verified:
       Order Number:      1827583
       Vendor:     ABC Toy Company
       Web Address:       www.abctoys.com
Order:
       1      ReallyFunToy       $49.95
       Shipping & Handling       4.20
       Transaction Fee    .80
       Total Charge:      $54.95
```

It is appreciated that while a preferred embodiment of the present invention has been described with a degree of particularity, it is the intent that the invention include all modifications and alterations from the disclosed design falling within the spirit or scope of the appended claims.

What is claimed is:

1. An apparatus of controlling the transmission of sensitive data to a remote data store comprising:

a) means for prompting a user to send a first subset of data, which is non-threatening, to the remote store by means of a first communications path using a first protocol; and b) means for prompting the user to send a second subset of data, which is also non-threatening, to the remote store by means of a second communications path using a second, different protocol, wherein said first and second subsets are used to complete a transaction.

2. The apparatus of claim 1 wherein the means for prompting the user for the first subset of data comprises a remote server that prompts or services the user with any one of the following:

a) HTML document, or b) a client/server data entry form, and wherein the means for prompting the user for the second subset of data comprises a computer employing any one of the following:

a) automated computer/telephone integration technology, b) a two-way digital paging system, or c) an exchange of messages with a personal data assistant.

3. An apparatus for enabling a user to initiate and complete a transmission of sensitive data to a remote data store comprising:

a) means for enabling a user to send a first subset of data, which is non-threatening, to the remote store by means of a first communications path using a first protocol; and b) means for contacting the user back and prompting that user to send a second subset of data, which is also non-threatening, to the remote store by means of a second communications path using a second, different protocol, wherein said first and second subsets are used to complete a transaction.

4. The apparatus of claim 3 wherein the means for enabling the user to initiate the transmission comprises any one of the following:

a) a World Wide Web document available on the Internet or on some private but non-secure Intranet, b) a client/server application available to the user, or c) an electronic mail facility, and wherein the means for completing the transmission by contacting and prompting the user for the second subset of data comprises a computer employing any one of the following:

a) automated computer/telephone integration technology, b) a two-way digital paging system, or c) an exchange of messages with a personal data assistant.

* * * * *